(12) United States Patent
Yang et al.

(10) Patent No.: US 6,700,627 B2
(45) Date of Patent: Mar. 2, 2004

(54) METHOD OF CHARACTERIZING A VIDEO DISPLAY

(75) Inventors: Jian Yang, Penfield, NY (US); Michael E. Miller, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 402 days.

(21) Appl. No.: 09/809,398

(22) Filed: Mar. 15, 2001

(65) Prior Publication Data

US 2002/0130975 A1 Sep. 19, 2002

(51) Int. Cl.$^7$ .................. H04N 17/00; H04N 17/02; H04N 5/202
(52) U.S. Cl. .................. 348/674; 348/179; 348/182
(58) Field of Search ............... 348/177, 178, 348/179, 180, 182, 184, 674, 675, 676, 677, 705, 553, 564, 569; 345/690; H04N 17/00, 17/02, 5/202

(56) References Cited

U.S. PATENT DOCUMENTS

| | | | | |
|---|---|---|---|---|
| 5,298,993 A | * | 3/1994 | Edgar et al. | 348/180 |
| 5,638,117 A | * | 6/1997 | Engeldrum et al. | 348/179 |
| 5,754,222 A | * | 5/1998 | Daly et al. | 348/184 |
| 5,933,130 A | * | 8/1999 | Wagner | 345/690 |
| 5,956,015 A | * | 9/1999 | Hino | 345/600 |
| 6,078,309 A | * | 6/2000 | Chen et al. | 345/589 |
| 6,278,433 B2 | * | 8/2001 | Narui | 345/581 |
| 6,388,716 B1 | * | 5/2002 | Tsuzuki et al. | 348/687 |
| 6,522,313 B1 | * | 2/2003 | Cottone | 345/22 |
| 6,535,301 B1 | * | 3/2003 | Kuwata et al. | 358/1.9 |

* cited by examiner

Primary Examiner—John Miller
Assistant Examiner—Brian P. Yenke
(74) Attorney, Agent, or Firm—Thomas H. Close

(57) ABSTRACT

A method of characterizing a video display, including the steps of providing a mathematical model of the display that relates code values to luminance output of the display, the model having a parameter that characterizes the display; displaying a reference patch and a test patch simultaneously on the display, the reference patch having a reference brightness produced by one or more luminances and the test patch having an test brightness produced by rapidly switching back and forth between two luminances; observing the display while varying one of the luminances keeping the others fixed, until the apparent brightness of the reference patch matches the apparent brightness of the test patch, and recording the code values employed to produce the luminances when a best match is made; and using the mathematical model, and the recorded code values to determine the value of the parameter that characterizes the display.

15 Claims, 3 Drawing Sheets

METHOD OF CHARACTERIZING A VIDEO DISPLAY

FIELD OF THE INVENTION

The present invention relates to video displays, and more particularly to methods of characterizing video displays.

BACKGROUND OF THE INVENTION

It is well known that the output luminance on a video display such as a CRT, liquid crystal, or light emitting diode display is a nonlinear function of the corresponding code value (or voltage), and a typical function 10 relating output luminance to input code value is shown in FIG. 1. This relationship is called the gamma curve. When the gamma curve is plotted in a logarithmic scale for both axes, the curve becomes more or less a straight line. The slope of this line is usually called the gamma value. It is often the case that the log—log version gamma curve is not strictly a straight line and the gamma value provides an imprecise description of the gamma curve. Therefore, more sophisticated relationships have often been used to model this curve. One such relationship is:

$$L(V) = \alpha(V+\beta)^\gamma, \quad (1)$$

where L is the output luminance of the display, V is an input code value used to indicate a desired luminance for the display, and $\alpha$, $\beta$, and $\gamma$ are parameters to be determined from a best fit to a set of measured data.

This nonlinear relationship has a severe consequence on the luminance distribution of the displayed images. In a simple image display system the image intensity is converted linearly to the code value, which servers as input to the display. If the input to output relationship defined in Equation 1 for the display is not a linear function, the luminance distribution of the displayed image is distorted from the desired distribution. Therefore the image quality on a given display can be quite different from that of another display or hard copy output device such as an inkjet or laser printer.

There are two ways to avoid this problem. One is to convert the intensity of an original image to code values based on a nonlinear function that compensates for the gamma curve of the display. The other, which is more often used in psychophysical experiments, is to create a nonlinear mapping (i.e., lookup table) between code value and the voltage supplied to control display luminance. The latter approach is called gamma correction, and allows the display characteristic to be readily compensated with minimal computation.

Using either of the two correction methods, one needs to know the gamma curve. It is straightforward to measure the relationship between luminance and code values if one has a photometer and appropriate display software. However, in most cases, end users have no access to the required devices to perform the measurements.

It is known to use a visual matching method to determine the parameters in Equation 1, in order to provide an estimation of the nonlinear function for individual CRT displays. For example U.S. Pat. No. 5,754,222 issued May 19, 1998 to Daly et al. shows a visual matching method to determine the relationship between code value and display luminance by displaying one patch having a constant code value over a large spatial extent and another patch having two known, but different code values which are interspersed throughout the spatial pattern, to characterize a display. One of the code values is adjusted until the perceived brightness of the patches match.

When performing a characterization by matching these two patterns, this approach takes advantage of a property of human vision that allows high spatial frequency changes in light to be integrated to the average value of the two different code values in the second pattern. This integration allows the user to match the perceived brightness of the two patterns even though the pixels within these patterns have different code values.

This method has a number of inherent problems. Among these problems is that the results of the calibration may be influenced by the modulation transfer function of the display. This effect becomes stronger as the addressibility and thus the resolution of the display is increased. A second, although not independent problem, is that when the resolution of the display or the frequency of the high spatial frequency pattern is decreased, the user begins to be able to distinguish the different luminance values within the high spatial frequency pattern and has difficulty fusing the light from the higher and lower code value portions of the high spatial frequency pattern. This can result in confusion on the part of the user and reduce their ability to perform the task in an accurate manner. A third problem relates to interaction between neighboring pixels in the display device. The prior art visual assessment methods assume that the code value to luminance response of any pixel on the display is independent of the state of all other pixels on the display. It is commonly understood that this assumption is not true for CRT displays. It is also not true on passive matrix flat panel displays due to leakage current in the display.

There is a need therefore for an improved method of characterizing a video display that avoids the problems noted above.

SUMMARY OF THE INVENTION

The need is met according to the present invention by providing a method of characterizing a video display, including the steps of providing a mathematical model of the display that relates code values to luminance output of the display, the model having a parameter that characterizes the display; displaying a reference patch and a test patch simultaneously on the display, the reference patch having a reference brightness produced by one or more luminances and the test patch having an test brightness produced by rapidly switching back and forth between two luminances; observing the display while varying one of the luminances, keeping the others fixed, until the apparent brightness of the reference patch matches the apparent brightness of the test patch, and recording the code values employed to produce the luminances when a best match is made; and using the mathematical model, and the recorded code values to determine the value of the parameter that characterizes the display.

ADVANTAGES

The method of the present invention has the advantage of avoiding problems in displays by displaying one region that has a constant luminance and one region whose luminance is varied between two code values over time. The present invention is most advantageous for use with a display having a fast temporal response and/or a low spatial resolution. This method takes advantage of the fact that the human eye integrates light over time, typically integrating light that is modulated at above 10 Hz in a way that is linear with increasing luminance. Since large spatial patterns are utilized, the modulation transfer function of the display does not affect the luminance response of any portion of the pattern and does not assume that the user will be able to spatially fuse the patterns that are displayed.

DETAILED DESCRIPTION OF THE INVENTION

The present invention provides a method for characterizing the code value to luminance relationship (i.e. gamma curve) of a video display by requiring the user to perform a visual match of known patterns. The invention is primarily applicable to characterize any product rendering objects on an electronic display screen where the characteristics of the display screen are not known. The results of the characterization of one output device can be useful in rendering images on another output device such as printers and soft display devices other than the one being characterized, to provide an approximate match to the rendering on the characterized device.

Figure 1:
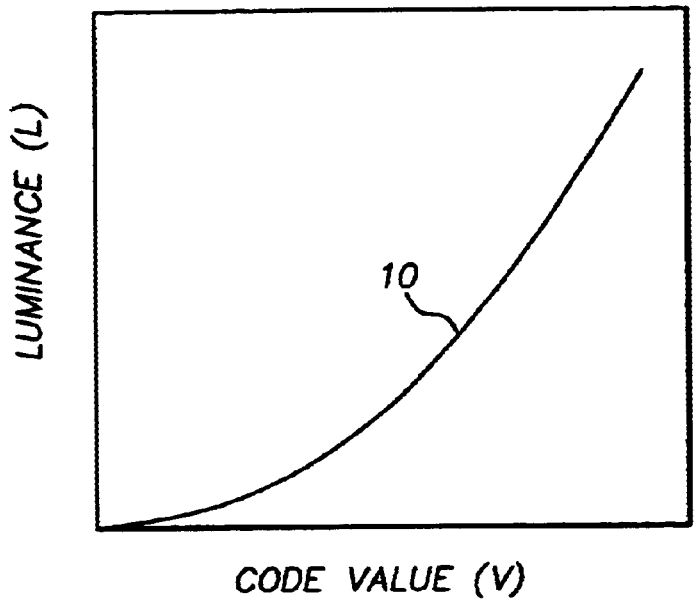
FIG. 1 is a graph showing a typical display output luminance versus code value.
Figure 2:
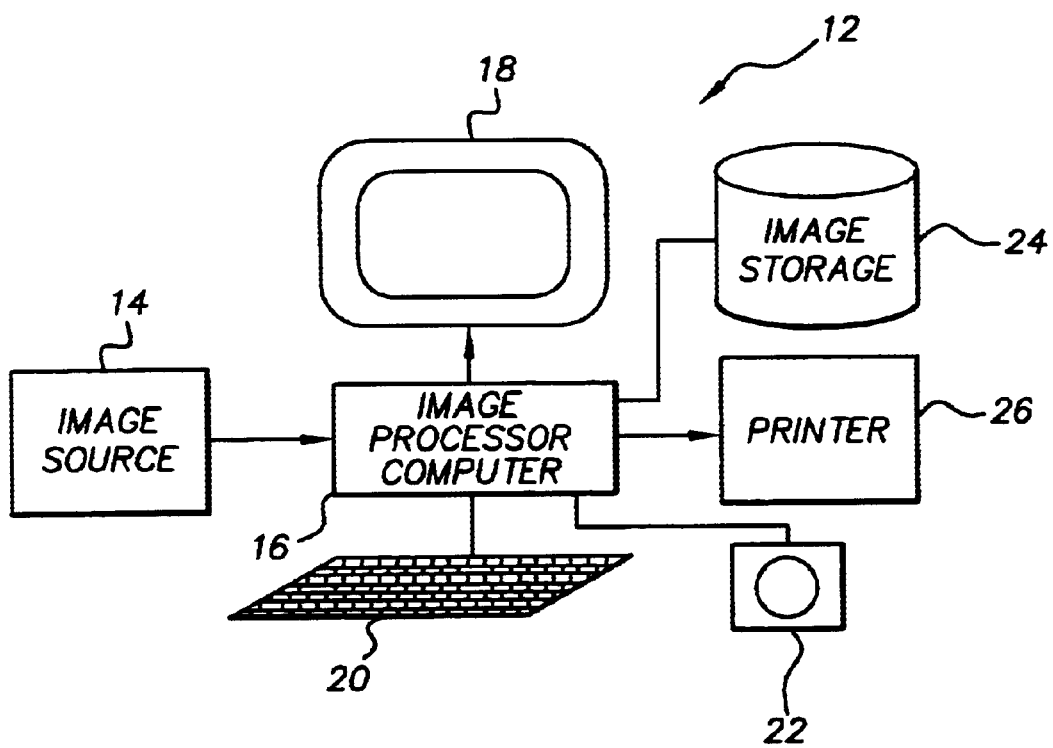
FIG. 2 is a schematic diagram of a system useful in practicing the method of the present invention.

Referring to FIG. 2, a typical image or graphic editing system 12 is shown. Note that in this figure, images or graphical object descriptions are obtained from a digital image source 14, such as a digital camera or scanner, or an image storage device, which may be local or remote from the rest of the system. Images from the image source 14 are processed by a digital image processing computer 16 and displayed onto an electronic display 18. The electronic display 18 can be for example a CRT, a plasma display, a light emitting diode display, a liquid crystal light valve display, a digital micromirror display, or an organic light emitting diode display. The user can view the images or graphical elements and edit, manipulate, or select among them using interface devices such as a keyboard 20 or mouse 22. As this manipulation occurs, the image processing computer 16 reacts to the user's input, updating the images or graphical elements on the display. Once this procedure is complete, the resulting image or graphical elements may be sent to an image storage device 24, such as a magnetic or optical disk memory, or they can be displayed on a display device 26 such as another electronic display or a digital printing device such as an ink jet, electrographic, digital photographic or thermal printer.

The present invention uses a temporally varying pattern to characterize a display. This approach does not need to make assumptions about pixel interaction or spatial integration properties of the human visual system that were employed in the spatial integration methods of the prior art. The invention does however assume that the update rate of the display is known, the decay time of the display is shorter than the integration time of the human eye, and that the temporal pattern will be integrated by the human eye. These assumptions are violated to some extent for certain types of electronic displays. Therefore, in the preferred embodiment of the present invention, the display has a refresh rate of 60 Hz or greater. The invention is also particularly advantageous for displays having a spatial resolution of less than about 30 cycles per degree of visual angle, since the high spatial frequency code value patterns of the prior art spatial integration methods become visible at these display resolutions.

To determine whether the method of the present invention is preferred for a particular display, one first determines the type of display and the capabilities of the display. Many displays, such as CRTs, Field Emissive Displays and Organic Light Emitting Diode displays have fast decay times and therefore, these displays can be characterized using the method of the present invention. Other displays, depending on their refresh rates and decay times may be more suitably characterized using the prior art spatial integration approach.

Figure 3:
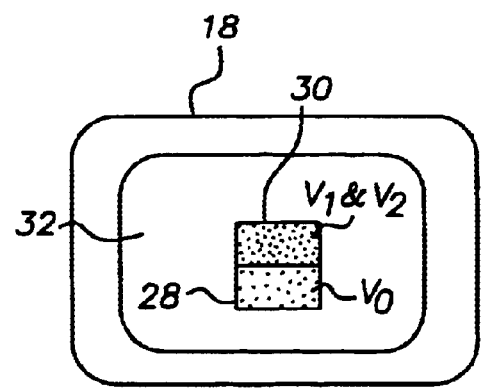
FIG. 3 is a schematic diagram showing a test pattern employed with the method of the present invention.
Figure 4:
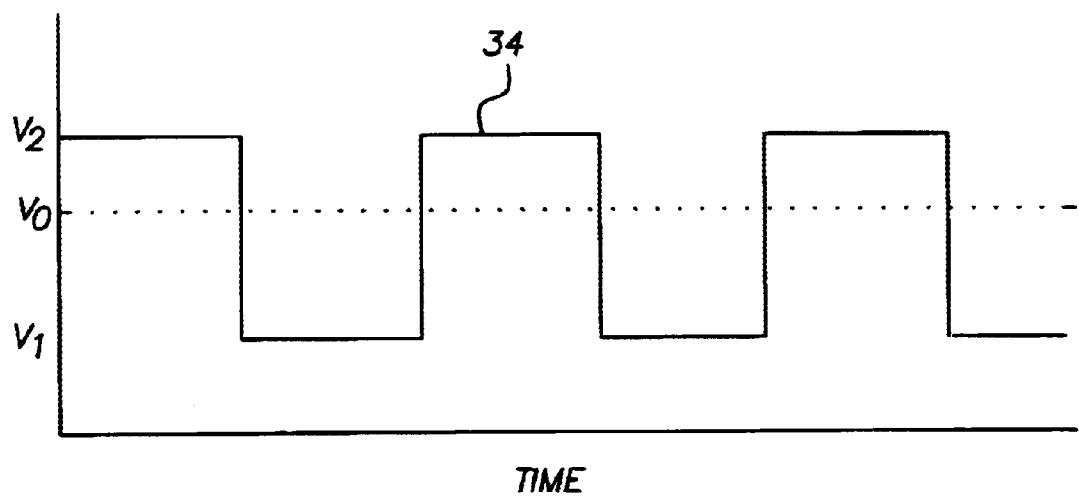
FIG. 4 is a timing diagram showing the code values applied to produce the test patches on a video display according to the present invention.

Referring to FIG. 3, according to one embodiment of the present invention, in performing the monitor characterization, a set of adjacent patches is produced on the display 18. A reference patch 28 having a brightness produced with a code value of V0 is displayed adjacent a test patch 30 produced by switching between code values $V_1$ and $V_2$ as shown by signal line 34 in FIG. 4. The background 32 may be set to a low code value, such as zero (0).

Figure 5:
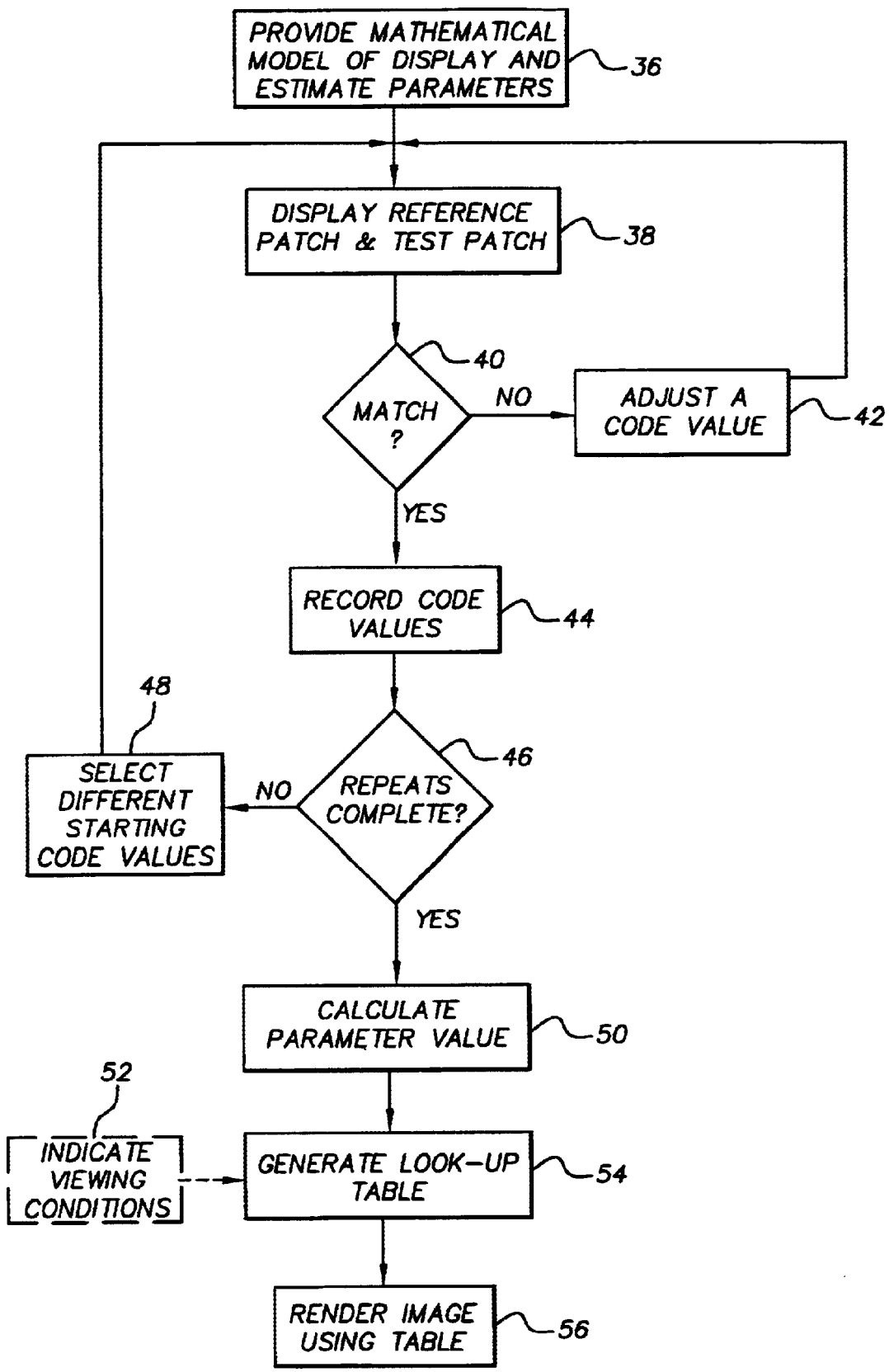
FIG. 5 is a flow chart illustrating the steps of the present invention.

Referring to FIG. 5, prior to performing the characterization of the display, a display model is chosen and estimated values for the parameters of the model are selected 36. Although many display models have been discussed within the literature, a convenient model for use with the present invention is the Equation (1), previously noted:

$$L=\alpha(V+\beta)^\gamma \qquad (1)$$

where L is the output luminance of the display, V represents the code value of the displayed pixel, $\beta$ and $\alpha$ are constants representing the black offset and the reflected luminance of the display, and $\gamma$ is the gamma value. It has been found that $\gamma=2$; $\beta=0$; and $\alpha=1$ are useful starting parameters for this model.

Next, a reference patch and a test patch are displayed 38 on display 18. The code value for the test patch is rapidly alternated between code values $V_1$ and $V_2$ with each code value being displayed some proportion of the possible display time. For example, the initial code values of the test patch can be chosen to represent the high and low extremes of possible code values (e.g. 0 and 255 for an 8-bit display). In the preferred embodiment, the code values will be alternated between each refresh of the display, having a duty cycle of 1:1. However, any duty cycle may be used, that is any ratio of update rates for $V_1$ and $V_2$ may be used. The reference patch is displayed with a code value of $V_0$ such that the user can match the brightness of reference test patch with the apparent brightness of the test patch. The initial value of $V_0$ is selected using a form of Equation (1) as described below.

If the luminance of the test patch is integrated linearly by the observer's visual system, the luminance of the test and reference patch are related using the following equation:

$$cL_0=aL_1+bL_2, \qquad (2)$$

where $L_1$, $L_2$, and $L_0$ are the luminance values of the display at code values $V_1$, $V_2$, and $V_0$, respectively. The constants a and b represent the numerator and denominator of the duty cycle and c is the sum of a and b. Based on Equations 1 and 2, and the assumed values for $\alpha$, $\beta$, and $\gamma$, the code value $V_0$ can be calculated using the equation:

$$V_0((a(V_1+\beta)^\gamma+b(V_2+\beta)/c)^{1/\gamma}-\beta \quad (3)$$

Should all assumed values be correct, the user will perceive the two patches to be of equal brightness. The user is then given the opportunity to indicate that a match is obtained 40 or to adjust one of the code values 42, for example $V_0$, until a match in perceived brightness is achieved. Should the user indicate that a match is made without adjusting the code value, the display conforms to the assumed values and the matching process is complete. Should the user change the code value $V_0$ to obtain a match, the procedure is repeated until a match is made.

After obtaining a brightness match for the combination of $V_0$, $V_1$, and $V_2$, the code values are recorded 44 and the procedure is repeated N times 46 using other starting values for $V_0$, $V_1$ and $V_2$ 48. After repeating the procedure N times (e.g. 6) the N sets of recorded code values are use to calculate 50, the parameters $\beta$ and $\gamma$ for example by estimation with an optimization algorithm to minimize a cost function E as shown below in Equations 4 and 5:

$$E(i)=\log\{[a(V_1(i)+\beta)^\gamma+b(V_2(i)+\beta)^\gamma]/[c(V_0(i)+\beta)^\gamma]\}, \quad (4)$$

and $$E=\Sigma[E(i)^2]. \quad (5)$$

where the summation is over the N sets of recorded code values. In Equation (4), there are two undermined parameters $\gamma$ and $\beta$. Thus, we need to have at least two sets of matching data to obtain the solution of the two parameters. Repeating the matching procedure more times improves the accuracy of the characterization.

For ease-of-use, the accuracy of the characterization can be compromised somewhat by assuming the offset parameter $\beta$ to be zero. In this case, Equation (4) contains only one free parameter $\gamma$, and the required least number of matching is reduced to one.

By performing an optimization using several matching pairs, a robust curve fit can be obtained even when the black level of the display is set improperly or when there is significant flare in the ambient environment. It should be noted that this procedure can either be applied to the neutral channel of the display (that is the values $V_0$, $V_1$, or $V_2$ can be applied to all three color channels of the display) or it can be applied to each of the three color channels independently. In the preferred embodiment, the user is provided a means of performing the matching for either the neutral channel of the display or for applying it to each of the three channels independently.

Once values are obtained for the parameters $\beta$ and $\gamma$ in Equation 1, these values may be used with an assumed value for $\alpha$ to approximate the code value to luminance response of the display system. Optionally, as shown by dotted lines in FIG. 5, the user can then be asked to indicate 52 the room illumination conditions in which they are viewing the display, from a list that relates room illumination conditions with viewing flare. Each of the room illumination conditions has an associated assumed value. As an example, this value may be near 1 for a dimly lit or dark room but may be larger for a daylit room with a lot of windows. Alternately, the user could be shown a number of patterns containing a number of low code value areas with the step size between each of the low code value regions increasing in size and be asked to select the first pattern in which he or she can see all of the regions. Knowing this pattern may then be used to estimate the flare within the viewing environment.

The characterization equation and the flare estimate can now be used to generate 54 a look up table that can be employed to render 56 any image or graphics that are to be displayed onto the display. For example, if an image is to be displayed that was rendered to have a gamma of 2.2, a beta of 0.2, and an alpha value of 4. Let's call these values $\gamma a$, $\beta a$, and $\phi a$, respectively. Where $\gamma$ and $\beta$ are the same as above, and $\phi$ is an estimated flare value. A look-up table can then be created having an index of the original code value and entries that are calculated from the equation:

$$LUT(I)=\text{round}((((V(I)/255)+\beta_a)^{\gamma a}+\phi_a)/\phi_a(((V(I)/255)+\beta)^\gamma+\phi)) \quad (6)$$

Where "round" indicates a function which rounds the output of the equation to the nearest integer value, CV(I) represents the code value in the look up table, 255 is a normalization constant indicating the range of code values in the look up table and the subscript $\alpha$ indicates the assumed values for the original image rendering.

The resulting LUT may then be used to transform an input image or graphical element to allow it to be displayed with the target appearance. Alternatively, the user could be permitted to edit the image on the electronic display and the inverse of this LUT could be used to transform the final image during printing to make it appear similar to the image shown on the display.

A particular embodiment of this invention has been described in detail. It should be noted, however, that various modifications can be made to this embodiment by individuals practiced in the art. In another embodiment, the code values of both the test and reference patches are temporally modulated over time. This embodiment differs from the initial embodiment since the code value of the reference patch is not a single value $V_0$, but instead is temporally modulated between code values $V_{01}$ and $V_{02}$. It should also be recognized by one practiced in the art that either the test or reference patch can be temporally modulated to more than two levels, although the observer is more likely to perceive flicker and have difficulty completing a match under these conditions.

It will also be recognized by one practiced in the art that the initial embodiment discusses the application of this invention to a monochrome system. This invention can be applied to a color imaging system by applying the monitor characterization procedure to each of the color channels within the color display system independently. That is, this procedure can be applied to the red, green, or blue channels in a tri-color display system to determine the monitor characterization for that one channel, it may then be applied to a second and then a third of these channels. This procedure will generally provide the best results when only the channel being characterized is active during the characterization procedure and the other channels are displayed with the minimum possible code value over the entire spatial extent of the display. It will also be recognized by one practiced in the art that the present invention can also be applied to the neutral channel of a color imaging system by simply using equal code values for all color channels while practicing this invention.

The invention has been described in detail with particular reference to certain preferred embodiments thereof, but it will be understood that variations and modifications can be effected within the spirit and scope of the invention.

PARTS LIST 10 gamma curve
12 graphic editing system
14 digital image source
16 digital image processing computer 18 electronic display
20 keyboard
22 mouse
24 image storage device
26 display device
28 reference patch
30 test patch
32 background
34 signal line
36 parameter values selected
38 display reference and test patch
40 obtain match
42 adjust code values
44 record code values
46 repeat procedure
48 use other values
50 calculate parameter values
52 indicate viewing conditions
54 generate look-up table
56 render an image

What is claimed is:

1. A method of characterizing a video display, comprising the steps of:
   a) providing a mathematical model of the display that relates code values to luminance output of the display, the model having a parameter that characterizes the display;
   b) displaying a reference patch and a test patch simultaneously on the display, the reference patch having a reference brightness produced by one or more luminances and the test patch having an test brightness produced by rapidly switching back and forth between two luminances;
   c) observing the display while varying one of the luminances keeping the others fixed, until the apparent brightness of the reference patch matches the apparent brightness of the test patch, and recording the code values employed to produce the luminances when a best match is made; and
   d) using the mathematical model, and the recorded code values to determine the value of the parameter that characterizes the display.

2. The method claimed in claim 1, wherein the reference patch is produced by a code value V0 and the test patch is produced by code values $V_1$ and $V_2$, where $V_1 > V_0 > V_2$.

3. The method of claim 1, further comprising the step of changing the luminances and repeating steps b) and c) at least one time and determining the best fit of the recorded code values to the model using mathematical optimization.

4. The method of claim 1, wherein the model has a plurality of parameters that characterize the display, and further comprising the step of changing the code values and repeating step b) and c) at least one time for each parameter.

5. The method claimed in claims 1, wherein the reference patch is also formed by switching back and forth between two luminances produced by code values $V_{01}$ and $V_{02}$, the test patch luminances are produced by code values $V_1$ and $V_2$, and where $V_{01} > V_1 > V_2 > V_{02}$.

6. The method claimed in claim 3, wherein the mathematical model is $L = \alpha(V+\beta)^\gamma$ and the value of the parameters $\gamma$ and $\beta$ are constrained by a cost function.

7. The method claimed in claim 5 wherein the code value V02 is 0.

8. The method claimed as in claim 2 where the code value $V_0$ is determined based on an initial estimate of the value of the model parameter and the chosen $V_1$ and $V_2$ values (see Equation 3).

9. The method claimed in claim 1, further including the steps of employing the determined parameter value to generate a look up table; and using the look up table to render an image for display on a display device.

10. The method claimed in claim 1, further comprising the steps of estimating viewing flare and adding the flare estimate to the model of the display.

11. The method claimed in claim 5, wherein the mathematical model is $L = \alpha(V+\beta)^\gamma$ and the value of the parameters $\gamma$ and $\beta$ are constrained by a cost function.

12. The method claimed in claim 11 wherein the cost function is: $E = \Sigma[E(i)^2]$, where $E(i) = \log\{[(V_1(i)+\beta)^\gamma + (V_2(i)+\beta)^\gamma]/[(V_{01}(i)+\beta)^\gamma + (V_{02}(i)+\beta)^\gamma]\}$.

13. The method claimed in claim 9, wherein the display device is a hard copy output device.

14. The method claimed in claim 9, wherein the display device is the video display.

15. The method claimed in claim 9, wherein the display device is a softcopy display device other than the video display.

* * * * *